(12) United States Patent
Dhuyvetter

(10) Patent No.: US 9,673,712 B2
(45) Date of Patent: Jun. 6, 2017

(54) FULL BRIDGE DC/DC CONVERTER CONTROL TECHNIQUES

(71) Applicant: Fairchild Semiconductor Corporation, San Jose, CA (US)

(72) Inventor: Timothy Alan Dhuyvetter, Arnold, CA (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 45 days.

(21) Appl. No.: 14/734,217

(22) Filed: Jun. 9, 2015

(65) Prior Publication Data

US 2015/0365000 A1    Dec. 17, 2015

Related U.S. Application Data

(60) Provisional application No. 62/012,210, filed on Jun. 13, 2014.

(51) Int. Cl.
*G05F 1/44* (2006.01)
*H02M 3/158* (2006.01)

(52) U.S. Cl.
CPC ................ *H02M 3/1582* (2013.01)

(58) Field of Classification Search
CPC .... H02M 3/1584; H02M 3/157; H02M 1/084; H02M 2001/0003
USPC ........ 323/207, 222, 225, 271, 272, 282–285
See application file for complete search history.

(56) References Cited

U.S. PATENT DOCUMENTS

| | | | | |
|---|---|---|---|---|
| 5,734,258 A | * | 3/1998 | Esser | H02M 3/1582 323/224 |
| 6,150,798 A | * | 11/2000 | Ferry | G05F 1/56 323/273 |
| 7,391,190 B1 | * | 6/2008 | Rajagopalan | H02M 3/1582 323/225 |
| 7,701,179 B2 | | 4/2010 | Chen et al. | |
| 7,952,900 B2 | | 5/2011 | Tomiyoshi et al. | |
| 8,698,462 B2 | * | 4/2014 | Lawson | H02M 1/10 323/206 |
| 8,907,642 B1 | * | 12/2014 | Burstein | H02M 3/1584 323/272 |
| 2013/0043852 A1 | | 2/2013 | Marsili et al. | |
| 2013/0162171 A1 | | 6/2013 | Ishii et al. | |

* cited by examiner

*Primary Examiner* — Rajnikant Patel
(74) *Attorney, Agent, or Firm* — Grossman Tucker Perreault & Pfleger PLLC

(57) ABSTRACT

The present disclosure describes full bridge power supply systems and control methods. In at least one embodiment, the full bridge power supply system may be driven utilizing a two-phase continuous conduction switching mode to control the inductor current. In another embodiment, the full bridge power supply system may be driven utilizing variably-configured three-phase continuous conduction modes to control the inductor current when an input voltage is within a window value to the output voltage. In another embodiment, the full bridge power supply may be driven using a four-phase discontinuous conduction switching mode to control the inductor current when a load current is below a current lower threshold.

14 Claims, 5 Drawing Sheets

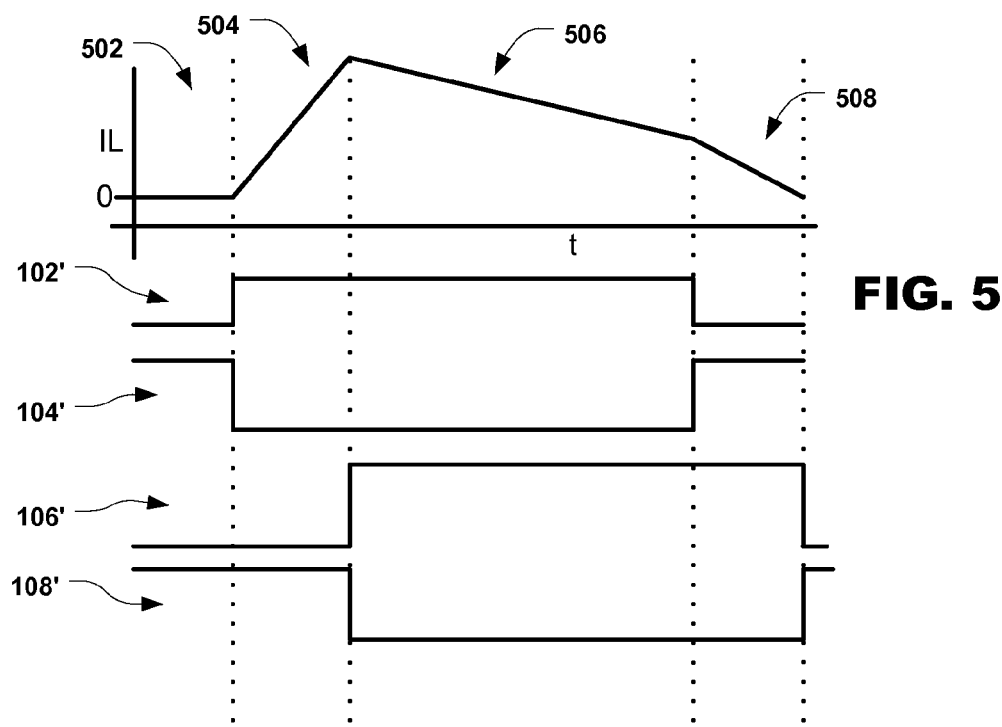

FULL BRIDGE DC/DC CONVERTER CONTROL TECHNIQUES

PRIORITY

The present application claims the benefit of provisional patent application 62/012,210 entitled "Full Bridge DC/DC Converter Control Techniques" with a filing date of Jun. 13, 2014. The entire contents of the above provisional application are incorporated by reference herein.

FIELD

The following disclosure relates to simulating power supply inductor current.

BACKGROUND

DC/DC converters may operate in a step-down (Buck) mode when Vin>Vout, and a step-up (Boost) mode when Vin<Vout. Some difficulties arise when Vin is approximately equal to Vout, since the duty cycle of DC/DC converter may be operating at or near the extrema, e.g., 0% in boost mode or 100% in Buck mode.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5 illustrates a signal plot and switch timing diagram for a four-phase operation embodiment.

Although the following Detailed Description will proceed with reference being made to illustrative embodiments, many alternatives, modifications and variations thereof will be apparent to those skilled in the art.

DETAILED DESCRIPTION

In general, the present disclosure describes full bridge power supply systems and control methods. In at least one embodiment, the full bridge power supply may be controlled for two-phase operation in a continuous conduction mode to control the inductor current. In another embodiment, the full bridge power supply may be controlled for three-phase operation in a continuous conduction mode to control the inductor current when the input voltage (Vin) is within a window value to the output voltage (Vout). In another embodiment, the full bridge power supply may be controlled for four-phase operation in a discontinuous conduction mode to control the inductor current utilizing pulse frequency modulation (PFM) techniques. Contrary to existing systems, the disclosed embodiments may provide enhanced operational control and enhanced efficiency, especially as Vin changes.

Figure 1:
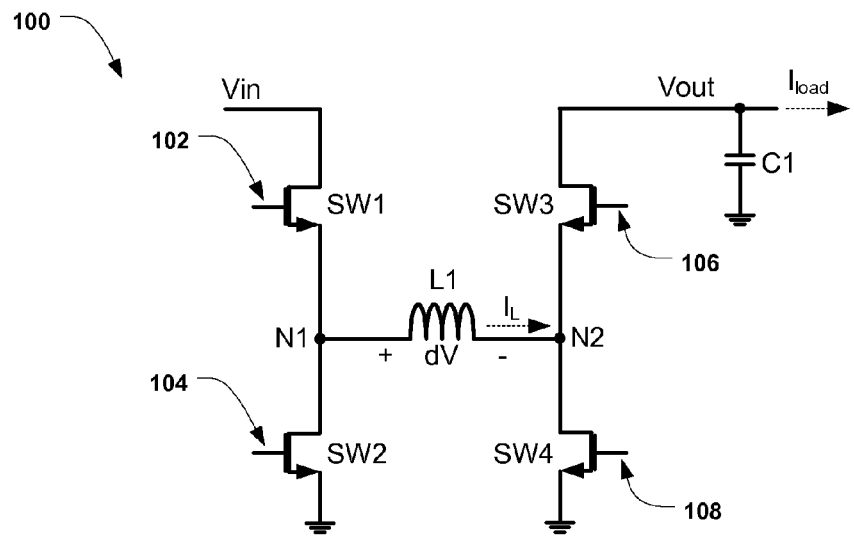
FIG. 1 illustrates a power supply system according to various embodiments of the present disclosure.

FIG. 1 illustrates a power supply system 100 consistent with various embodiments of the present disclosure. The system 100 comprises full bridge DC/DC converter circuitry that may include, for example, four switches SW1, SW2, SW3 and SW4 coupled to an input voltage (Vin) and an inductor L1. In at least one example implementation, switches SW1 and SW2 may be coupled in series between Vin and ground, with node N1 situated where switch SW1 couples to switch SW2. Likewise, switches SW3 and SW4 may be coupled in series between Vout and ground, with node N2 falling where switch SW3 couples to switch SW4. Inductor L1 may be coupled between nodes N1 and N2. The switches may be controlled to charge the inductor L1 and to control the discharge of inductor L, which may generate an output voltage (Vout) by charging output capacitor C1 (e.g., to supply controllable power to a load coupled to Vout). The conduction state of switches SW1, SW2, SW3 and SW4 may be controlled by switch control signals 102, 104, 106 and 108, respectively. The switches may include, for example, metal oxide semiconductor (MOS) switches, bipolar junction transistor (BJT) switches, and/or other known or after-developed switch technology. Moreover, while all of the switches are illustrated as NMOS transistors, implementations may be all PMOS transistors or may comprise combinations of NMOS and PMOS transistors. For example, in at least one example implementation SW1 and SW3 may be PMOS transistors while SW2 and SW4 are NMOS transistors. The use of different switch technologies may alter how switch control signals 102, 104, 106 and 108 are implemented (e.g., highs and lows in the signals may be reversed). The switches may be controlled to operate in a Buck mode, boost mode, and/or a hybrid mode, as will be described in greater detail below.

Figure 2:
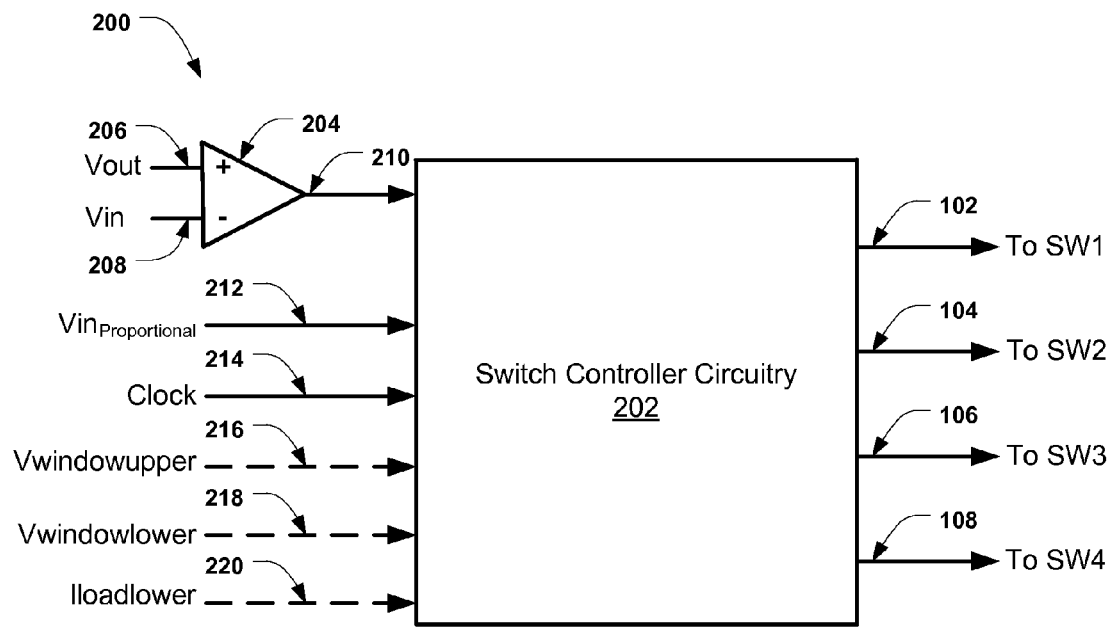
FIG. 2 illustrates switch controller circuitry according to various embodiments of the present disclosure.

FIG. 2 illustrates control circuitry 200 consistent with various embodiments of the present disclosure. The control circuitry may include switch controller circuitry 202 configured to generate switch control signals 102, 104, 106 and 108 based on one or more input signals. Switch controller 202 may comprise one or more separate electronic components alone or along with an integrated circuit solution that may further include data processing resources such as programmable logic configurable to implement any or all of various the operations described herein. The switch control signals 102, 104, 106 and 108 may include for example, pulse width modulation (PWM) signals for operation in continuous conduction mode and/or pulse frequency modulation (PFM) signals for operation in discontinuous conduction mode. Input signals to the switch controller circuitry 202 include a signal proportional to Vin 212 and a clock signal 214. The circuitry 200 may also include comparator circuitry 204 configured to compare Vout 206 with Vin 208 and generate a difference signal (Vdifference) 210 representative of the difference between Vout 206 and Vin 208. In at least one embodiment, the Vout 206 input to comparator circuitry 204 may be replaced with an output voltage target signal (Vtarget) input since under typical operating conditions the two voltages may be substantially equal (e.g., the control circuitry 200 may control power supply system 100 so that Vout is equal to Vtarget).

In some embodiments described herein, the switch controller circuitry 202 may also be configured to receive an upper window voltage signal 216 (Vwindowupper) representative of a voltage signal that is above Vin and a lower window voltage signal 218 (Vwindowlower) representative of a voltage signal that is below Vin. Vwindowupper and Vwindowlower may be configured to allow the power supply circuitry 100 to operate within an operational range to maximize efficiency. In at least one embodiment, the configuration may be based on duty cycle. For example, a window may be specified to cause the power supply circuitry 100 to operate between a 10% duty cycle and a 90% duty cycle. An alternative control mode (e.g., three phase operation) may then be employed in instances where the power supply circuitry would normally slip below 10% or rise above 90% duty cycle. Alternatively, the upper and lower window limits may be defined based on voltages such as Vin, Vout and/or Vtarget. In other embodiments, the switch controller circuitry 202 may also be configured to receive a load current lower limit signal 220 (Iloadlower). The load current ($I_{load}$) may be the current being drawn by the load coupled to Vout. Iloadlower may correspond to load current threshold above which the switch controller circuitry 202 may operate in continuous conduction (PWM) mode and below which the switch controller circuitry 202 may operate in discontinuous conduction (PFM) mode.

2-Phase Operation in Continuous Conduction Mode

Figure 3A:
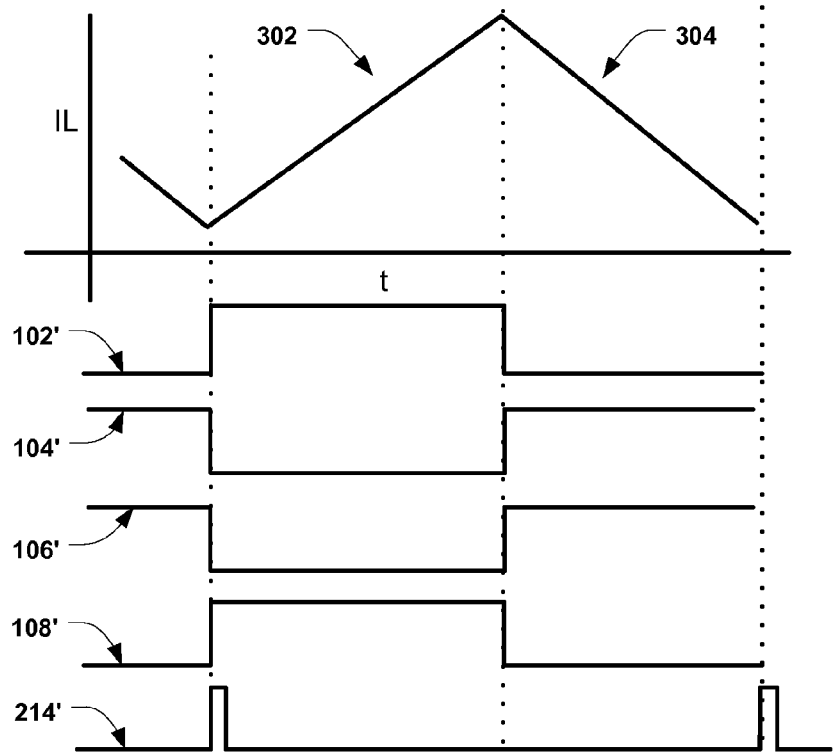
FIG. 3A illustrates a signal plot and switch timing diagram for a two-phase boost operation embodiment.

FIG. 3A illustrates a signal plot and switch timing diagram 300 for a two-phase boost operation embodiment. Initially, the use of an apostrophe after reference number (e.g., 102') in a drawing indicates that an example embodiment of the element corresponding to the reference number is being illustrated. With continued reference to FIGS. 1 and 2, in this embodiment it is assumed that the load current $I_{load}$ exceeds Iloadlower and the switch controller circuitry is operating in continuous conduction (PWM) mode. Also, it is assumed that the switches of the power supply system 100 are turned on by a high voltage value and turned off by a low voltage value. The signal plot 300 depicts the inductor current ($I_L$) over time as signals 102' to 108' drive switches SW1 to SW4, respectively. In a first phase 302, the switching of switches SW1 to SWE4 causes the inductor current to increase and in the second phase 304 causes the inductor current to decrease. Both phases 302 and 304 occur within a single clock period as shown at 214'. Switches SW1 and SW4 are turned on at the beginning of the first phase 302 (as shown by signals 102' and 108', respectively) thus delivering energy to the inductor L1. Switches SW2 and SW3 are turned off at the beginning of the first phase 302 as shown by signals 104' and 106', respectively. Switches SW1 and SW4 are then turned off at the beginning of the second phase 304 and switches SW2 and SW3 are turned on, thus removing energy from the inductor and delivering power to the load coupled to Vout. Thus, the first phase 302 may be considered a charge phase for the inductor L1 while the second phase may be considered a power phase for providing current $I_L$ to drive the load. The above operation may, in at least one embodiment, employ current sense feedback to implement peak current control that may improve load step response for power supply system 100. For example, given that possible allowed switching combinations may include SW1 and SW4 being on, SW2 and SW3 being on, SW1 and SW3 being on, and SW2 and SW4 being on, current sensing for the entirety of power supply system 100 may be accomplished by sensing current through two if the four switches (e.g., by sensing current flowing through the side of SW1 coupled to Vin and the side of SW3 coupled to Vout).

Figure 3B:
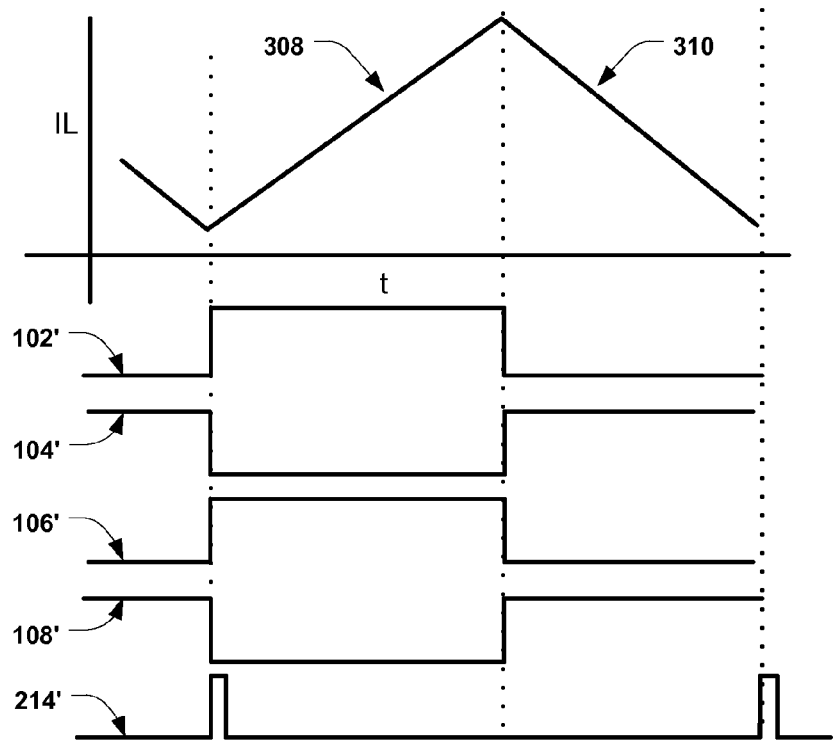
FIG. 3B illustrates a signal plot and switch timing diagram for a two-phase buck operation embodiment.

FIG. 3B illustrates a signal plot and switch timing diagram 300 for a two-phase buck operation embodiment. The waveform disclosed in FIG. 3B may be the same as, or similar to, FIG. 3A in that $I_L$ may be controlled in two phases, wherein the switching of switches SW1 to SW4 in accordance with switch control signals 102' to 108', respectively, may cause $I_L$ to rise in first phase 308 and to then decrease in second phase 310. However, since Vin is greater than Vout in buck operation, the switching of SW3 and SW4 may be reversed as shown in switch control signals 106' and 108', respectively. The two-phase buck operation disclosed in FIG. 3B may also employ current sense feedback, but as opposed to the above may implement valley current control that may improve load step response for power supply system 100.

3-Phase Operation in Continuous Conduction Mode

Figure 4A:
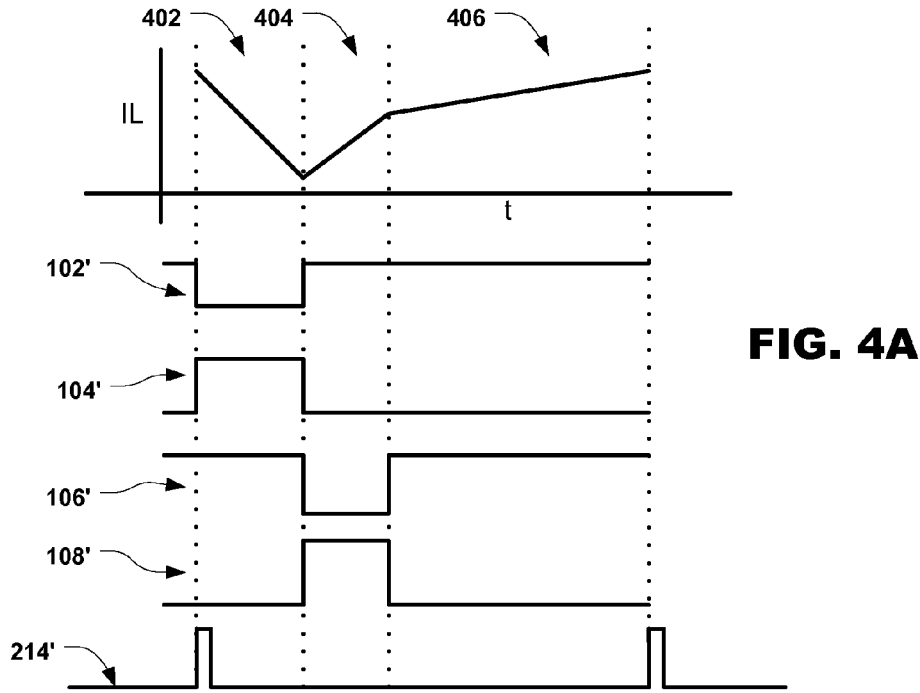
FIG. 4A illustrates a signal plot and switch timing diagram for a three-phase operation embodiment.

FIG. 4A illustrates a signal plot and switch timing diagram 400 for a three-phase operation embodiment. With continued reference to FIGS. 1 and 2, in this embodiment it is assumed that $I_{load}$ exceeds Iloadlower and the switch controller circuitry is operating in PWM mode. Also, it is assumed that the switches of the power supply 100 are turned on by a high voltage value and turned off by a low voltage value. Also, in this embodiment it is assumed that the state of the power supply 100 is such that Vin>Vout and that Vin/Vout<Vwindowupper. In other words, the operation of the power supply according to FIG. 4A is for a scenario when Vin is approximately equal to (but greater than) Vout.

Example 400 comprises three phases 402, 404 and 406 that all occur within a single clock period as shown at 214'. At the beginning of a first phase 402, $I_L$ is decreasing and switch SW1 turns off, switch SW2 turns on, switch SW3 remains on and switch SW4 remains off (e.g., in accordance with signals 102' to 108' illustrated in FIG. 4A). At the beginning of second phase 404 switch SW1 turns on, switch SW2 turns off, switch SW3 turns off and switch SW4 turns on, which causes 404 $I_L$ to increase at a first rate. At the end of the second phase 404, $I_L$ does not reach the level that existed at the beginning of the first phase 402. A third phase 406 may be used to achieve volt-second balance of the transformer L1. At the beginning of the third phase 406 switch SW1 remains on, switch SW2 remains off, switch SW3 turns on and switch SW4 turns off to cause $I_L$ to increase at a second rate. In at least one embodiment, the first rate of increase in $I_L$ may be greater than the second rate of increase in $I_L$. In this manner, the circuit is controlled so that in first phase 402 the power supply system 100 is operating in a buck mode, in the second phase 404 the power supply system 100 is operating in a boost mode, and in the third phase 406 the power supply circuit operates in a mode to balance the volts-second of the inductor L1 per cycle so that $I_L$ is equalized between phases.

Figure 4B:
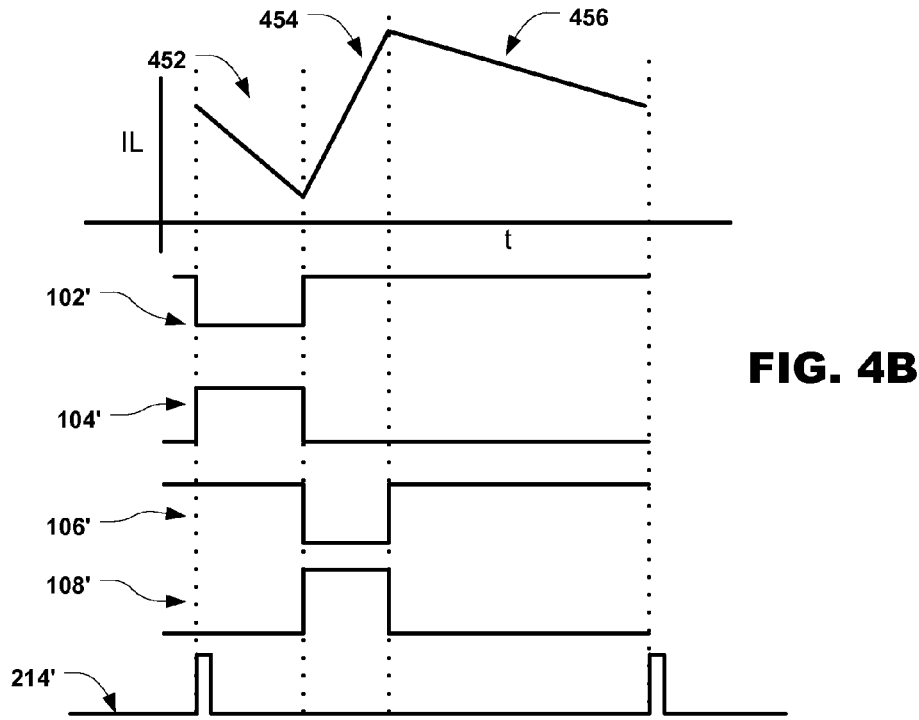
FIG. 4B illustrates a signal plot and switch timing diagram for another three-phase operation embodiment.

FIG. 4B illustrates a signal plot and switch timing diagram 450 for another three-phase operation embodiment. With continued reference to FIGS. 1 and 2, in this embodiment it is assumed that the $I_{load}$ exceeds Iloadlower and the switch controller circuitry is operating in PWM mode. Also, it is assumed that the switches of the power supply 100 are turned on by a high voltage value and turned off by a low voltage value. Also, in this embodiment it is assumed that the state of the power supply 100 is such that Vin<Vout and that Vin/Vout>Vwindowlower. In other words, the operation of the power supply according to FIG. 4B is for a scenario when Vin is approximately equal to (but less than) Vout.

At the beginning of a first phase 452, the inductor current is decreasing and switch SW1 turns off, switch SW2 turns on, switch SW3 remains on and switch SW4 remains off (e.g., in accordance with signals 102' to 108' illustrated in FIG. 4B). At the beginning of a second phase 454, the inductor current increases and switch SW1 turns on, switch SW2 turns off, switch SW3 turns off and switch SW4 turns on. At the end of the second phase 454, the inductor current exceeds the level that existed at the beginning of the first phase 452. A third phase 456 may be used to achieve volt-second balance of the transformer L1. At the beginning of the third phase 456, switch SW1 remains on, switch SW2 remains off, switch SW3 turns on and switch SW4 turns off to allow the inductor current to decrease. As a result, power supply system 100 may operate in a boost mode. In this mode of operation, current sense may be configured for peak current control.

Consistent with the present disclosure, the series of three phases disclosed in each of FIGS. 4A and 4B may be inverted and still may perform the same functionality (e.g., controlling power supply system 100 to generate Vout). For example, the example of FIG. 4A may be inverted so that an initial boost mode phase may be followed by a buck mode phase and then an equalization phase wherein the inductor current gradually decreases to equalize the inductor current across all phases. Similarly, the example of FIG. 4B may be inverted so that an initial boost phase may be followed by a buck phase and then an equalization phase wherein the inductor current gradually increases to equalize the inductor current across all phases.

4-Phase Operation in Discontinuous Conduction Mode

FIG. 5 illustrates a signal plot and switch timing diagram 500 for a four-phase operation embodiment. With continued reference to FIGS. 1 and 2, in this embodiment it is assumed that $I_{load}$ is below Iloadlower and the switch controller circuitry is operating in PFM mode. Also, it is assumed that the switches of the power supply 100 are turned on by a high voltage value and turned off by a low voltage value.

Example 500 comprises four phases 502, 504, 506 and 508. During the first phase 502, switch SW1 remains off, switch SW2 remains on, switch SW3 remains off and switch SW4 remains on (e.g., in accordance with signals 102' to 108' illustrated in FIG. 5) which causes the inductor current $I_L$ to remain at approximately 0. During the second phase 504, switch SW1 turns on, switch SW2 turns off, switch SW3 remains off and switch SW4 remains on to cause $I_L$ to increase. During the third phase 506, switch SW1 remains on, switch SW2 remains off, switch SW3 turns on and switch SW4 turns off, and as a result $I_L$ decreases at a first rate. During the fourth phase 508, switch SW1 turns off, switch SW2 turns on, switch SW3 remains on and switch SW4 remains off, causing $I_L$ to decrease at a second rate. In at least one embodiment, the second rate of decrease may be greater than the first rate of decrease. As a result, in first phase 502 power supply system 100 is idle, second phase 504 is a boost mode, third phase 506 is an equalization phase so that in steady state IL is equal across the phases, and the fourth phase 508 is a ramp down mode to allow excess IL current not used to charge output capacitor C1 to be dissipated.

In at least one embodiment, the power supply system 100 may remain in phase 502 idle mode until Vout drops below a low threshold value level. In phase 508, the control method may be changed from clocked PWM with current mode control to non-clocked hysteretic mode control with current mode control. The switching frequency may be allowed to vary with load condition, wherein as the load decreases and Vout drop rate decreases the converter switching period increases. Control system 100 then becomes load-dependent in this mode of operation.

Consistent with the present disclosure, the series of four phases disclosed in the example of FIG. 5 may be inverted and still may perform the same functionality (e.g., controlling power supply system 100 to generate Vout). For example, the example of FIG. 5 may be inverted so that an initial idle phase may be followed by a buck mode phase, an equalization phase wherein the inductor current gradually increases and a final ramp up phase.

Figure 6:
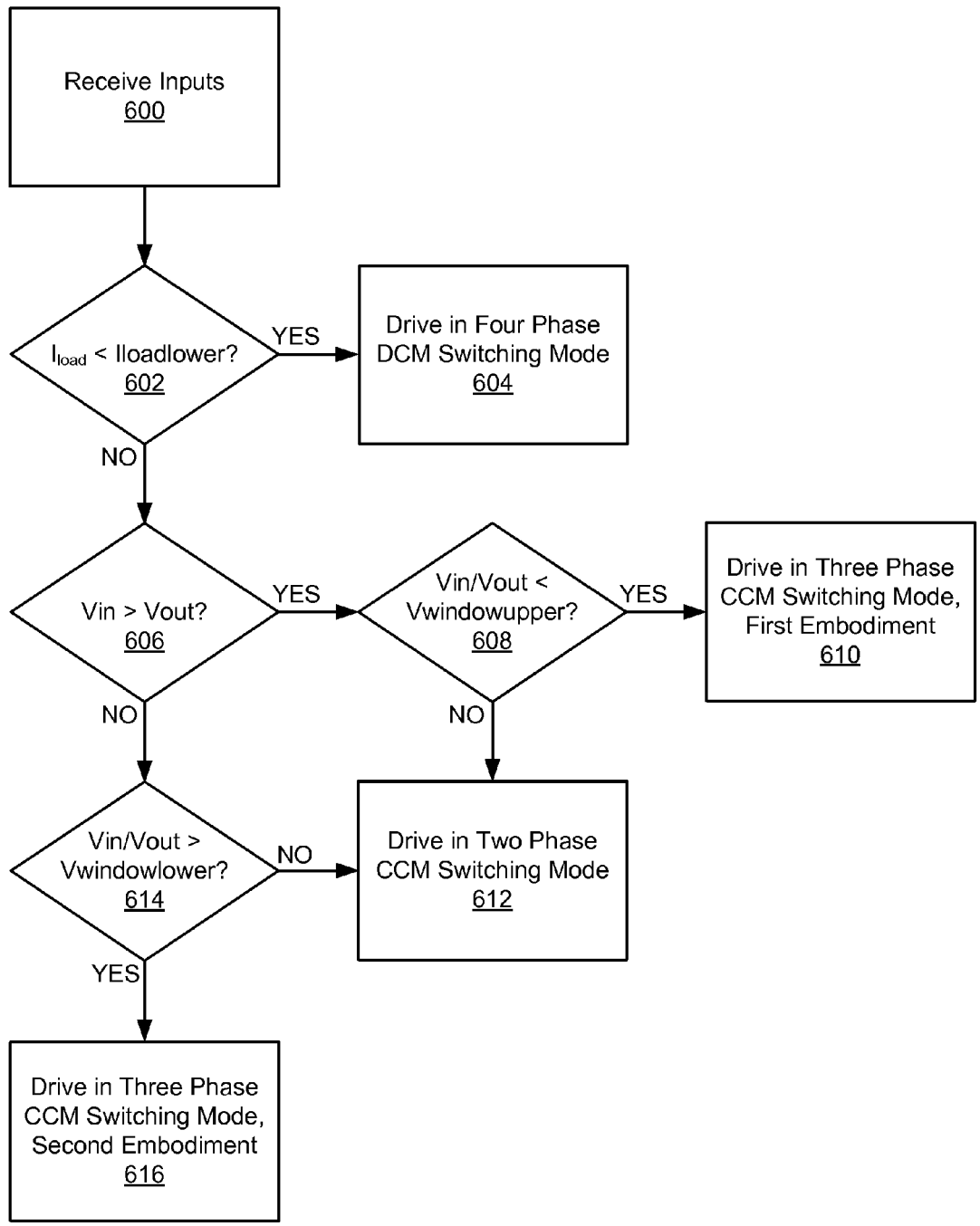
FIG. 6 illustrates example operations for selecting an operational mode for power supply circuitry according to various embodiments of the present disclosure.

FIG. 6 illustrates example operations for selecting an operational mode for power supply circuitry according to various embodiments of the present disclosure. In operation 600 inputs may be received (e.g., in switch controller circuitry). A determination may then be made in operation 602 as to whether $I_{load}$ is less than iloadlower. If in operation 602 it is determined that $I_{load}$ is less than iloadlower, then in operation 604 the power supply system may be driven using a four phase DCM switching mode (e.g., as shown in FIG. 5).

If in operation 602 it is determined that $I_{load}$ is not less than iloadlower, the in operation 606 a further determination may be made as to whether Vin is greater than Vout. If in operation 606 it is determined that Vin is greater than Vout, then in operation 608 a further determination may be made as to whether Vin/Vout is less than Vwindowupper (e.g., whether the difference between Vin and Vout is within a certain voltage window). If in operation 608 it is determined that Vin/Vout is less than Vwindowupper, then in operation 610 the power supply system may be driven using a first embodiment of a three phase CCM switching mode consistent (e.g., as shown in FIG. 4A). If in operation 608 it is determined that Vin/Vout is not less than Vwindowupper, then in operation 612 the power supply system may be driven using a two phase switching mode (e.g., as shown in FIG. 3).

If in operation 606 it is determined that Vin is not greater than Vout, then in operation 614 a further determination may be made as to whether Vin/Vout is greater than Vwindowlower (e.g., whether the difference between Vin and Vout is within the certain voltage window). If in operation 614 it is determined that Vin/Vout is greater than Vwindowlower, then in operation 616 the power supply system may be driven using a second embodiment of a three phase CCM switching mode consistent (e.g., as shown in FIG. 4B). If in operation 608 it is determined that Vin/Vout is not greater than Vwindowlower, then in operation 612 the power supply system may be driven using a two phase switching mode (e.g., as shown in FIG. 3).

In at least one example embodiment, a power supply system may comprise converter circuitry to receive an input voltage and generate an output voltage based on the input voltage and switch controller circuitry to drive the converter circuitry utilizing a switching mode selected from a plurality of switching modes, wherein the switch controller circuitry is to determine a switching mode to select to drive the converter circuitry based on whether a difference between the input voltage and the output voltage is within a voltage window.

In another example embodiment, switch controller circuitry may comprise at least one input to receive at least a difference signal based on a difference between an input voltage to converter circuitry and one of an output voltage of the converter circuitry or output target voltage of the converter circuitry, an upper window voltage corresponding to a voltage window and a lower window voltage corresponding to the voltage window, at least one output to couple to the converter circuitry and determination circuitry to select a two phase continuous conduction switching mode to drive the converter circuitry when the difference signal is determined to be outside of the voltage window or a three phase continuous conduction switching mode to drive the converter circuitry when the difference signal is determined to be within the voltage window.

In another example embodiment, a power supply system control method may comprise receiving inputs into switch controller circuitry, determining based on the inputs whether an input voltage to converter circuitry being driven by the controller circuitry is greater than an output voltage generated by the converter circuitry, determining whether a difference between the input voltage and the output voltage is within a voltage window, determining a switching mode to select from a plurality of switching modes for driving the converter circuitry based on the relative magnitude and voltage window determinations and driving the converter circuitry with the switch controller circuitry based on the selected switching mode to generate the output voltage.

"Circuit" or "circuitry", as used in any embodiment herein, may comprise, for example, singly or in any combination, hardwired circuitry, programmable circuitry, state machine circuitry, and/or firmware that stores instructions executed by programmable circuitry.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

What is claimed:

1. A power supply system, comprising:
   converter circuitry to receive an input voltage and generate an output voltage based on the input voltage; and
   switch controller circuitry to drive the converter circuitry utilizing a switching mode selected from a plurality of switching modes, wherein the switch controller circuitry is to select a two phase continuous conduction switching mode when a difference between the input voltage and the output voltage is determined to be outside of a voltage window, and select a three phase continuous conduction switching mode when the difference between the input voltage and the output voltage is determined to be within the voltage window, a third phase of the three phases being an equalization phase to equalize an inductor current across all of the phases.

2. The system of claim 1, wherein the converter circuitry comprises at least full bridge direct current (DC) to DC converter circuitry.

3. The system of claim 1, wherein the converter circuitry comprises at least:

first and second switches coupled in series between the input voltage and ground;
   a first end of an inductor coupled to a node between the first and second switches;
   third and fourth switches coupled in series between the output voltage and ground; and
   a second end of the inductor coupled to a node between the third and fourth switches.

4. The system of claim 3, wherein the switch controller circuitry is to at least generate a first signal to drive the first switch, a second signal to drive the second switch, a third signal to drive the third switch and a fourth signal to drive the fourth switch.

5. The system of claim 1, wherein the voltage window comprises at least an upper window voltage signal and a lower window voltage signal.

6. The system of claim 5, wherein in determining the switching mode to drive the converter circuitry the switch controller circuitry is to:
   receive at least a difference signal based on a comparison between the input voltage and one of the output voltage or an output target voltage, the upper window voltage and the lower window voltage;
   determine whether the input signal is greater than the output signal; and
   determine whether the difference signal is within the voltage window based on at least one of the upper window voltage and the lower window voltage.

7. The system of claim 6, wherein the switch controller circuitry is to determine the switching mode also based on a load current lower limit representative of a threshold for a load current below which the switch controller circuitry may operate in continuous conduction mode.

8. The system of claim 7, wherein the switch controller is circuitry to select a four phase discontinuous conduction switching mode to drive the converter circuitry when the load current is determined to be less than the load current lower limit.

9. The system of claim 8, wherein the four phases include an idle phase, a boost phase, an equalization phase and a ramp down phase.

10. The system of claim 9, wherein in the ramp down phase switching frequencies for switches in the converter circuitry are allowed to vary based on a condition of a load coupled to the converter circuitry.

11. Switch controller circuitry, comprising:
    at least one input to receive at least a difference signal based on a difference between an input voltage to converter circuitry and one of an output voltage of the converter circuitry or output target voltage of the converter circuitry, an upper window voltage corresponding to a voltage window and a lower window voltage corresponding to the voltage window;
    at least one output to couple to the converter circuitry; and
    determination circuitry to select a two phase continuous conduction switching mode to drive the converter circuitry when the difference signal is determined to be outside of the voltage window or a three phase continuous conduction switching mode to drive the converter circuitry when the difference signal is determined to be within the voltage window, a third phase of the three phases being an equalization phase to equalize an inductor current across all of the phases.

12. The switch controller circuitry of claim 11, wherein at least one input is to receive a load current lower limit representative of a threshold for a load current below which the switch controller circuitry may operate in continuous conduction mode; and the determination circuitry is to select a four phase discontinuous conduction switching mode to drive the converter circuitry when the load current is determined to be less than the load current lower limit.

13. A power supply system control method, comprising:
receiving inputs into switch controller circuitry;
determining based on the inputs whether an input voltage to converter circuitry being driven by the controller circuitry is greater than an output voltage generated by the converter circuitry;
determining whether a difference between the input voltage and the output voltage is within a voltage window;
determining a switching mode to select from a plurality of switching modes for driving the converter circuitry based on the relative magnitude and voltage window determinations;
selecting a two phase continuous conduction switching mode when the difference between the input voltage and the output voltage is determined to be outside of the voltage window;
selecting a three phase continuous conduction switching mode when the difference between the input voltage and the output voltage is determined to be within the voltage window, a third phase of the three phases being an equalization phase to equalize an inductor current across all of the phases; and
driving the converter circuitry with the switch controller circuitry based on the selected switching mode to generate the output voltage.

14. The method of claim 13, further comprising:
determining whether a load current to a load coupled to the converter circuitry is greater or less than a load current lower limit; and
selecting a four phase discontinuous conduction switching mode including an idle phase, a boost phase, an equalization phase and a ramp down phase when the load current is determined to be less than the load current lower limit.

* * * * *